Dec. 21, 1965  H. R. WARREN ETAL  3,224,711
HEAVIER-THAN-AIR AIRCRAFT
Filed April 19, 1963  4 Sheets-Sheet 1
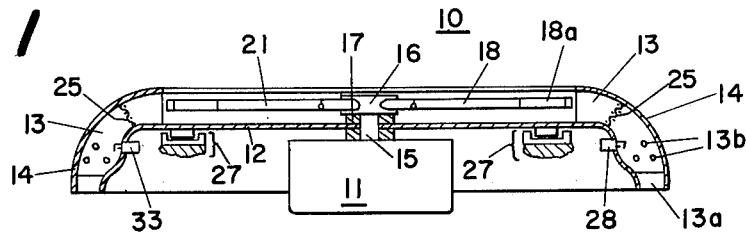
Fig. 1
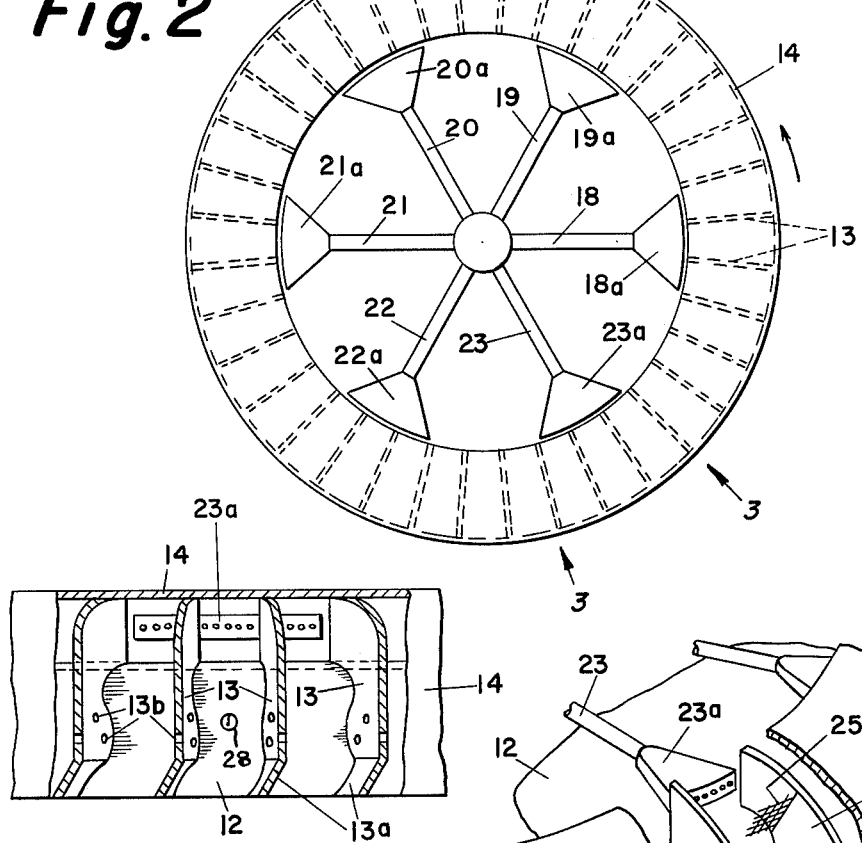
Fig. 2
Fig. 3
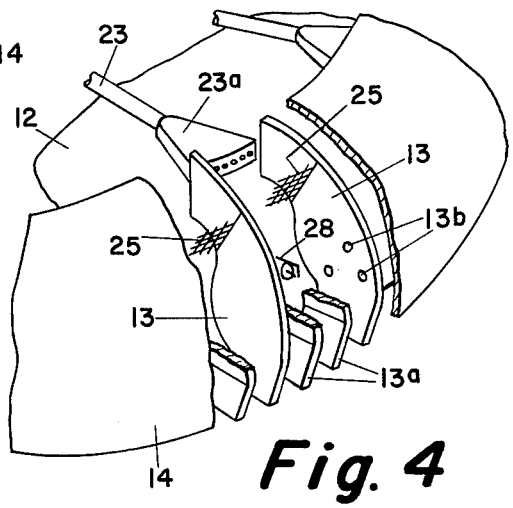
Fig. 4

Dec. 21, 1965    H. R. WARREN ETAL    3,224,711
HEAVIER-THAN-AIR AIRCRAFT
Filed April 19, 1963    4 Sheets-Sheet 2

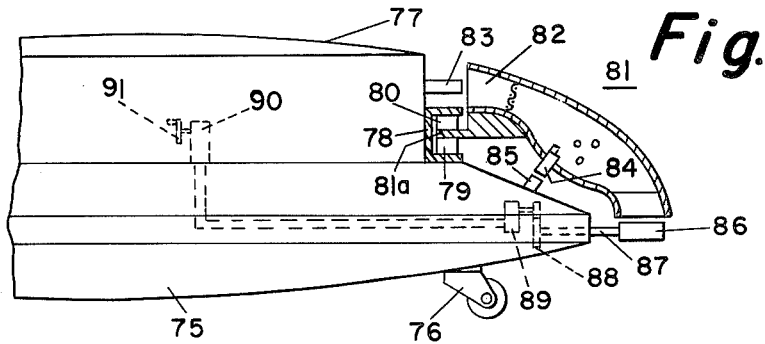

3,224,711
HEAVIER-THAN-AIR AIRCRAFT
Henry R. Warren, Coral Gables, Fla. (Apt. 206, 2300 W. 1st St., Fort Myers, Fla.), and Russell P. Warren, Neptune Beach, Fla. (3711 Kelley St., Fort Myers, Fla.)
Filed Apr. 19, 1963, Ser. No. 274,136
9 Claims. (Cl. 244—23)

This invention relates to a prime mover particularly adapted to heavier-than-air aircraft and has for an object the provision of such a prime mover characterized by its light weight, high efficiency, reliability, rugged construction, and its embodiment as an airfoil section.

There have been many proposals to provide heavier-than-air aircraft with fans and propellers forming a part of, or auxiliary to, the wings or airfoil structures to increase the lift. There have been proposals to increase the speed of flow of air over the wings to increase the lift. While such proposals have demonstrated the validity of the principles upon which they have been based, they have left much to be desired in attainment of desired high efficiency, ease of manufacture, and adaptability to the aircraft itself.

In carrying out the present invention in one form thereof, there is provided a driving member having a plurality of air-compressing and turbine-driving elements disposed in circular array around and forming a driving connection with the driving member. An enclosing member extends over and around said elements and forms with the driving member (1) an air-compressing region, the region occupied by the compressing elements, (2) a turbine-driving zone, and in between the two, (3) a combustion zone.

In one form of the invention, the driving member comprises an imperforate base plate with the air-compressing blades secured thereto near its periphery. The enclosing member may likewise be secured to the air-compressing elements. These air-compressing elements may extend through the combustion zone and terminate in angularly disposed end portions to form the turbine-driving elements. Each form of the invention is characterized by the unitary assembly of the driving member, the air-compressing elements and the turbine-driving elements in driving connection therewith and disposed in circular array around its circumference. It is in this manner that the elements are located in the region of maximum radius from its axis of rotation and by means of which air, through the suction developed by the air-compressing elements, flows into said elements and is there compressed and delivered under high pressure to the combustion zone. By introducing fuel into the air and igniting it in the combustion zone, its volume is increased, its temperature is increased, and by reason of the added energy developed therein, there is adequate torque developed by the turbine blades to drive the assembly at high speed.

As applied to heavier-than-air aircraft, the enclosure member comprises an air deflector which is arranged to receive the high velocity air and/or products of combustion and to redirect them from radial flow to one more nearly axial, the consequence of which is the development of high reaction forces developed through an annular region and uniformly generally axially of the assembly. Additionally, the turbine blades are located at the periphery and arranged so that the discharge of the gases and products of combustion therethrough develop a jet of annular configuration, the reaction forces of which also add to and contribute lifting effort to the assembly.

In order that the assembly may operate at high efficiency without undue increase in the temperature of the turbine blades and associated parts, the combustion zone is subdivided into a plurality of segmental portions, each separated by a like segmental portion in which no combustion occurs. As a consequence, each combustion zone may be operated at maximum efficiency and without diminution of temperature due to the excess air over the amount needed for combustion. By reason of the fact that the turbine blades and the associated parts exposed in each combustion area to the high temperatures, are rapidly moved to the intermediate cooler area, the average temperature is maintained well below the failure temperatures of the metal utilized in the construction.

For further objects and advantages of the invention and for a detailed explanation of its principles and the several forms which it may take, reference is to be had to the following detailed description taken in conjunction with the accompanying drawings, in which:

FIG. 1 is a sectional elevation of a prime mover embodying the present invention and also useful as a lifting and propelling assembly for heavier-than-air aircraft;

FIG. 2 is a top plan view of FIG. 1;

FIG. 3 is a fragmentary side view of the assembly of FIG. 2 with portions broken away and parts in section and taken on the arrows 3—3 of FIG. 2;

FIG. 4 is a three dimensional view of one of the combined air-compressing and turbine-driving elements and includes a combustion zone therebetween;

Figure 5:
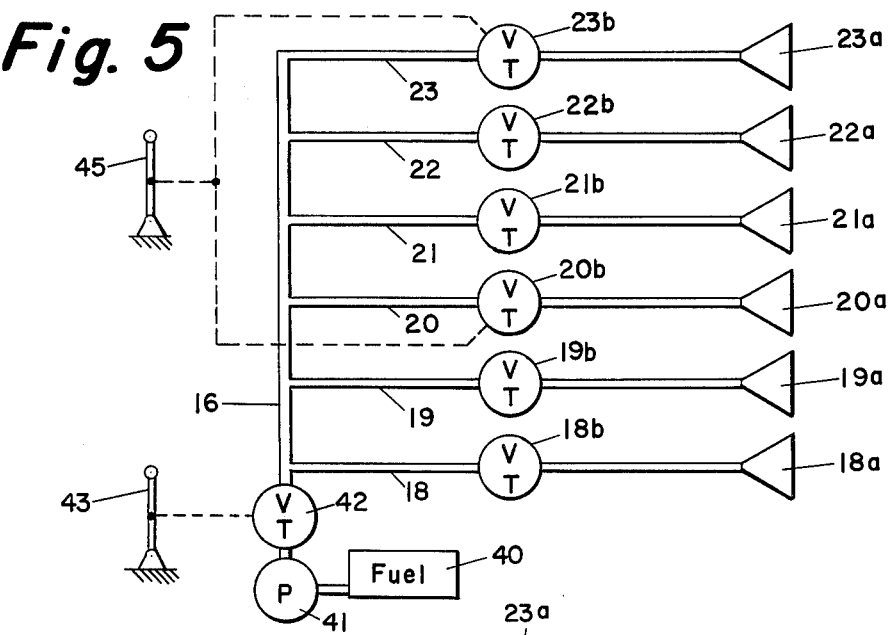
Figure 6:
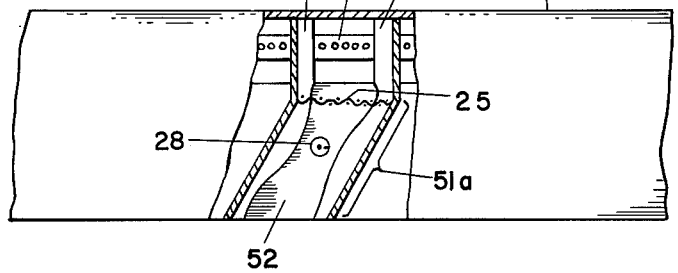
Figure 7:
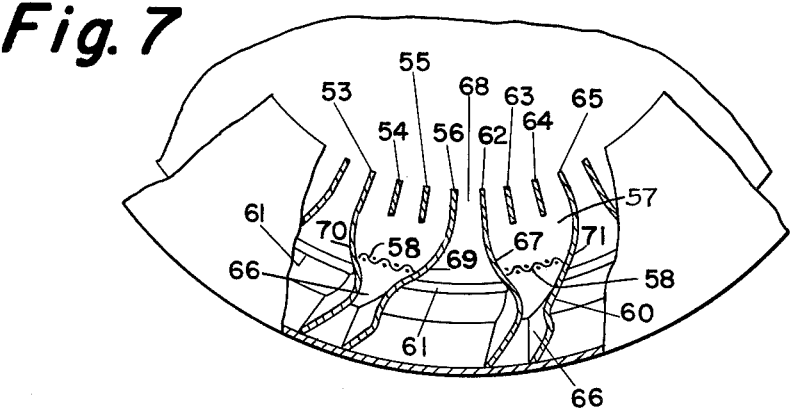
Figure 12:
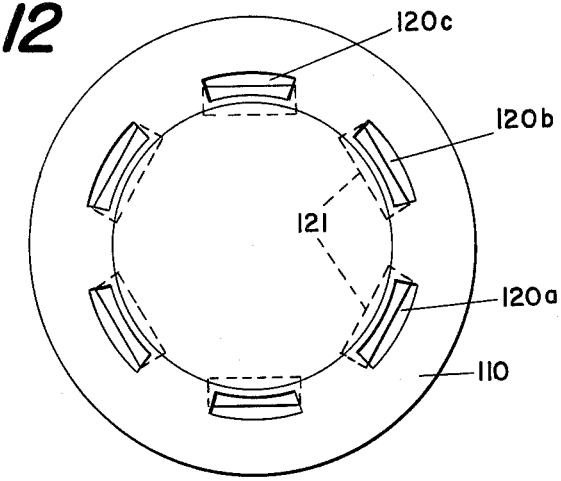
Figure 13:
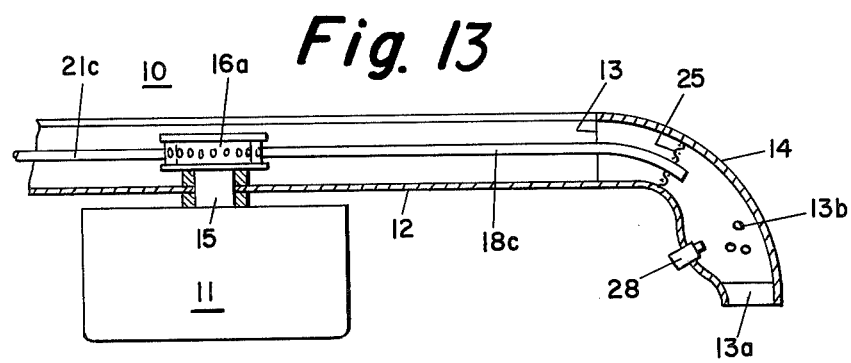

FIG. 5 diagrammatically illustrates a fuel distributing and controlling system applicable to the several embodiments of the invention;

FIG. 6 is a fractional view partly in section which illustrates an arrangement suitable for use in the embodiment of FIGS. 1–4, inclusive;

FIG. 7 is a fractional view partly in section which illustrates a preferred embodiment for enhancement of the jet action;

FIG. 8 is a side elevation partly in section of a modified form of the invention;

FIG. 9 is a plan view of FIG. 8;

FIG. 10 is a side elevation of a modification;

FIG. 11 is a side elevation partly in section of a modified form of the invention;

FIG. 12 is a plan view of the arrangement of FIG. 11;

FIG. 13 illustrates a further modification of a fuel delivery system.

Referring now to FIG. 1, the invention has been illustrated as applied to a prime mover 10 particularly well adapted to form a part of a lifting and propelling assembly for heavier-than-air aircraft. As a matter of fact, if the housing 11 of FIG. 1 be considered a cabin of small size or other compartment for air transportation, the assembly of FIG. 1 itself comprises the heavier-than-air aircraft. The arrangement includes a driving member 12 having disposed in circular array around its outer periphery a plurality of air-compressing and turbine-driving elements 13. The number and spacing will depend upon the diameter selected for a particular embodiment. In general, the elements 13 will be closely spaced, as for example, the spacing utilized in fluid-driven turbines. Though the blades 13 may be preferably welded to the driving member 12 shown as an imperforate plate, they need only be secured in driving relationship therewith by any suitable means. Though an outer enclosing member 14 may be stationary, in the embodiment of FIG. 1 it too has secured thereto the air-compressing and turbine-driving elements 13.

The assembly thus far described is rotatably mounted on a hollow shaft 15 suitably supported in the cabin or housing structure 11 and terminating in a hollow distributing head and bearing structure 16 which cooperates with the second part 17 of the bearing structure which rests against the driving member 12. Though fuel introduced through the hollow shaft 15 may be uniformly distributed by the head 16 to the annular air inlet defined by the inward edges of the air-compressing elements, it will in general be preferred to sub-divide the fuel flow into a multiplicity of streams. Specifically, there extends from the distributing head 16 a plurality of fuel pipes 18–23 respectively terminating in distributing heads 18a–23a. Fuel forced through the heads 18a–23a is preferably subdivided into a multiplicity of tiny streams for introduction of the fuel in the form of mist, where liquid fuel is utilized. It will be observed that each of the fuel distributing heads 18a–23a has an arcuate length approximately equal to the intervening space between them, and each spans a multiplicity of the air-compressing elements 13, as best seen in FIG. 3. In FIG. 4 only selected elements 13 have been illustrated in full in order better to illustrate the inclination of the lower turbine-driving portions thereof.

With fuel introduced into the regions between the air-compressing elements 13 and assuming rotation of the assembly comprising the driving plate 12, the elements 13 and the enclosing member 14, it will be understood at once that air is caused to flow through the air-compressing elements 13 and outwardly thereof, the principle thereof being that of a simple fan and air compressor of the centrifugal type wherein the air is inducted at the central opening and accelerated in an outward radial direction thereby increasing both the kinetic energy and pressure of the air with increasing radial distance from the central opening. The section of the air-compressing and turbine-driving elements extending from the inlet adjacent the heads 18a–23a to the interposed fire screen 25 comprises the region for delivering air under high pressure to a combustion zone which may be considered that region along the elements 13 extending from the screen 25 to the angularly disposed end portions 13a of elements 13 and which form the turbine-driving sections thereof. Associated with each fire screen (25 of FIG. 4) of each embodiment is a conventional flame-holder baffle (not shown) which causes the air to eddy and allows the combustion to take place without allowing the flame to be blown out of the combustion zone due to the high velocity of the air stream in the entrance portion of the combustion zone. Similarly conventional starting equipment, not shown, to initiate rotation of the blade-assembly is provided.

Though many igniters each disposed within a combustion zone may be provided, a single one may suffice, since it will be observed that the elements 13 in the region of the combustion zone have a multiplicity of perforations 13b through which flame in any region will propagate itself, with a blow-torch action to the combustion zones intermediate the elements 13.

In FIG. 1 there will be preferably provided magnetos 27, one for each of the fuel distributing heads 18a–23a. A multiplicity of igniters 28–33 are provided in association with stationary magnets forming a part of each magneto so that as each coil of each magneto passes its stationary magnet, an arc will be produced between the points of the igniters extending into each combustion zone. In this manner, the fuel is to a large degree consumed in each combustion zone forming a segmental part of the assembly as a whole, and with each combustion zone having interposed therebetween a zone of lower temperature in which little or no combustion takes place. These combustion zones or chambers, as a result, may be operated at high temperature and without the need for introduction of excess air for the purpose of providing safe lower operating temperatures than would otherwise be the case.

In accordance with tthe present invention, the air-compressing and turbine-driving elements may, for the relatively short periods of time during which the combustion products attain their maximum temperature, be subjected to those temperatures, since they are then immediately cooled by reason of their movement to a region between the distributing heads. Hence the regions in which the combustion takes place then receive the cooler air absent the fuel. More particularly, while the fuel introduced by the heads 18a–23a in mixture with the air under high pressure produces rapid and complete combustion of the fuel in each of the combustion chambers or zones, these zones or chambers intermediate the adjacent elements 13 of each segmental area rapidly change due to the high rate of rotation. Thus the elements, particularly the portions exposed to the flame and products of combustion, are subjected to the high temperatures for relatively short periods of time, and then to much lower temperatures in the region between the distributing heads and thus their average temperature is safely below the working strengths of the materials for the speeds utilized.

The manner in which the arrangement of FIGS. 1–4 may be controlled for forward or reverse movement in any selected direction will be later set forth in detail. Though several different arrangements may be utilized, one comprises the throttling of the fuel or of the air supplied to one of the combustion zones, or throttling in opposite directions fuel and air at a diametrically opposite combustion zone. In each case, if the lifting forces be increased in the region of a combustion zone, the aircraft as a whole will be tilted about a horizontal axis. In this manner, the annular jet coinciding with the exit paths from the turbine-driving elements 13a will be inclined, and thus the vehicle will be moved in a forward direction. If the lifting effort be differently increased at the diametrically opposite combustion zone, the tilting action will be about the same horizontal axis but in the opposite direction, and hence the annular jet stream will cause the aircraft to move in the opposite direction.

In FIG. 5 there has been diagrammatically illustrated a control system in which fuel is supplied from a tank 40 by pump 41 to the main throttling valve 42 which, under the control of a throttle 43, is delivered by the header or distributing head 16 to the several fuel pipes 18–23 and thence to the fuel distributing heads 18a–23a. Each of the fuel supply lines 18–23 includes its own throttling valve 18b–23b, and it will be understood that these valves will normally have the same setting in order to deliver fuel at the same rate to the several distributing heads. However, in the event it is desired or required to "trim the ship," minor adjustments can be made in the throttling valves for opposing distributing heads. Moreover, it is preferred that two oppositely disposed heads, such as the heads 20a and 23a, shall have their respective throttling valves 20b, 23b adjustable by a direction-determining lever 45. This lever 45, through mechanical connections indicated by the broken lines, operates the valves 20b and 23b to increase the flow of fuel to one of the heads 20a and 23a while decreasing the flow of fuel to the other. In this manner, there is increased the quantity of combustion products generated and likewise the speed with which they are discharged from the turbine-driving elements 13a or one combustion zone while they are decreased in the other combustion zone. The differential of thrust thus produced is adequate to cause a tilting of the ship and thus the development of the forward component of force which drives the ship in the direction of the tilt. It is to be understood, of course, that there may be additional direction-controlling levers 45, each associated with a pair of throttling valves for the distributing heads located diametrically opposite each other, and thus the pilot may choose any of the many directions for travel of a ship without need to turn on a vertical axis.

It is to be further understood that the connections between the main throttle 43 and the valve 42 may include air-responsive means for modifying the action of valve 42 in response to elevation, more particularly, to atmospheric pressure. Thus, there can be introduced compensation as may be required for different flying conditions.

Now that certain of the principles of the invention have been explained in connection with the modification of FIGS. 1–5, it is to be understood that many modifications may be made and that certain of the features of the above modification may be utilized with those later to be described, and vice versa. As exemplary of modifications falling within the scope of the present invention, may be mentioned the fact that the fuel distributing heads 18a–23a may be combined into an annular ring and arranged to distribute fuel throughout the annular inlet to the air-compressing elements. On the other hand, the radial extent of the distributing heads 18a–23a may be greater than illustrated with corresponding decrease in the intermediate cooling areas, and vice versa. The partciular design selected will depend upon the size of the aircraft, the speed desired, the type of fuel to be utilized, and other considerations well understood by those skilled in the art of turbine operations and also of heavier-than-air aircraft requirements.

Though the air-compressing and turbine-driving elements 13 of the above modification have been shown and described as single structures, it is to be understood that they may be subdivided as later shown. The air-compressing portions may be of one material, and the turbine-driving elements of a different material, with the combustion zone disposed intermediate the two.

Inasmuch as there are only four requirements in accordance with our invention, namely, the initial air-compressing section, the combustion zone, the driving zone, and the change of direction of the gases for development of a component of upward thrust, it will be seen that these four objectives may be attained by the simplified structure of FIG. 6. This figure is an end view as it would appear if viewed on the lines 3—3 of FIG. 2. FIG. 6 illustrates elements 50 and 51 as typical of all of the elements in circular array around the driving member 12, these elements in side view being the same as those of FIG. 1. The firescreen 25 is disposed between the elements for the same purposes as in FIG. 1. The principal difference between the arrangements of FIGS. 3 and 6 is that in the latter the driving portion is formed by the annular disposition of the lower portions of each blade and as indicated at 51a. By angularly inclining the blades from the region of the screen 25, which prevents backfire of the fuel, there is avoided the sharp bend of the turbine elements as appearing at 13a in FIG. 3. Thus by having the whole of section 51a inclined at an angle and with the burning of the fuel taking place in the combustion zone 52, the increase in volume, velocity and temperature of the gases does not produce any great abrading action as in the case of the angularly disposed portions 13a of FIG. 3. Instead, in the arrangement of FIG. 6 the large increase in volume and temperature of the gases produces a greatly enhanced jet action with increased reactive forces on the vehicle and approaches the operation of a ram jet.

Further to enhance the ram jet action, the arrangement of FIG. 7 may be preferred. In FIG. 7 the air-compressing elements 53–56 develop a body of moving air in each compressing zone 57 with high velocity and increased pressure, it being noted that a plurality of air-compressing elements are utilized to supply each compression zone 57. This zone decreases in cross-sectional area to the region of each fire screen 58, and then at substantially uniform cross-sectional area forms ram jet portions 66. To enhance the action as a ram jet, a venturi section is provided at 60, i.e., a reduction in cross-section in one region to increase the velocity of the mixture of fuel and air just prior to its combustion in the following zone. Pipes 61 interconnect the combustion zones of the plurality of ram jet sections for propagation of the flame from one to the other. It will be understood that there will be a plurality of sections like the one just described, only a second such section being illustrated and comprising the air-compressing blades 62–65, these serving jointly to supply the high velocity air and fuel to another of the ram jet combustion zones 66.

Though the blade 67 extending from the air-compressing element 62 may originate at the blade 56, it has been shown with its origin at the blade 62 in order that cooler air may be introduced between blades 56 and 62 as indicated by the arrow 68. Thus, this cooling air will reduce the temperature of the blades 67 and 69, and similar cooling will take place on all of the remaining blades including blades 70 and 71.

By enhancing the thrust from the ram jet sections 66, the reactive forces will be correspondingly increased. This means that the upward thrust will be of such greater magnitude that the remaining requirements will be correspondingly less. More particularly, by combining a plurality of compressor or air-moving sections for each of the ram jets 66, the required amount of air for each ram jet section will be attained at a required rotation of the air-moving elements materially and substantially less than would be required to supply the required amount of air for the embodiments of FIGS. 1–4 and 6.

When it is considered that each of the assemblies being described may be 20 to 30 feet in diameter, these dimensions being by way of illustration and not limitation, it will be seen that there can readily be provided a multiplicity of ram jets all contributing reactive forces on the plane, torque to drive the air-moving and compressing elements. The structure as a whole is dimensionally balanced for smooth operation and includes smoothly contoured airfoil structure which itself provides lift on forword movement of the aircraft. Thus, for an assembly having a diameter of, say, 30 feet, the central opening for inflow of air to the air-compressing section may be but of the order of 3 feet. The entranceways into the air-compressing elements will be of the order of 6 inches high and subdivided in accordance with the number of compressor blades utilized. The cross-sectional area of the remaining passage then increases in the region of the combustion zone and then rapidly decreases until the radial width of the exit passage comes to the order of one inch. It is to be understood that these dimensions are suggestive, and they will be varied to meet different design requirements, as already mentioned.

As applied to an aircraft of the type used for passengers, camera work, and the like, the arrangement of FIG. 8 may be preferred. The cabin 75 will be streamlined, provided with landing gear 76, and preferably with a streamlined roof 77 which in some instances may be of clear plastic. A circular structural member 78, shown as a simple channel in cross-section, is bolted to, and also forms the principal structural member for, the cabin 75. The channel 78 contains the two elements 79 and 80 of a bearing structure for an annular projection 81a of the driving assembly 81. This driving assembly for convenience has been illustrated as of the same type as shown in FIG. 1, though either of the arrangements of FIGS. 6 or 7 may be preferred. Fuel is injected into the air-compressing portion 82 by means of a distributing head 83, admission of fuel to which is under the control of the pilot. The igniting means 84 is of the same type as shown in FIG. 1 with the permanent magnet structure 85 secured to the cabin.

Inasmuch as there will be some drag force developed by the bearing structure, there will be a tendency for the cabin to rotate in the same direction as that of the driving assembly 81. The drag force may be of a relatively low order, and in any event may be readily compensated by providing one or more vanes 86 rotatably mounted on shaft 87 rotated through gearing 88 as from a servo motor 89 under the control of a transmitting servo 90 by operation of a control lever or wheel 91.

As better illustrated in FIG. 9, the control vane 86 may be disposed intermediate the two fuel distributing heads 83 and 92, and thus the temperature of the gases constantly wiping its surface will be lower than those directly below the combustion zones.

Where enhanced forward speed is desired, and particularly where the cabin is to be maintained horizontal, use can be made of deflecting vanes 95 and 96 as illustrated in FIG. 10. These, in top plan view, are of arcuate construction following the arc of the annular driving jet 97. The vanes 95 and 96 are operated through shafts and gearing 98 as by a control lever or wheel 99 to rotate them about horizontal axes 100 and 101 and in the same directions. Thus if the vanes 95 and 96 be rotated in a counterclockwise direction through, say, 10°, it will be noted that the high velocity gases issuing from the forward portion 97a of the annular jet will produce a forward component of force on the cabin structure 75. With the vane 96 at the same 10° angle, at the same counterclockwise position, there will be a further forward thrust by reaction of the gases against the vane for the trailing portion 97b. The arcuate extent of vanes 95 and 96 may be varied as desired, though in general it will be preferred that they not greatly exceed the arcuate extent of the burners located diametrically opposite each other as in FIG. 2, as for example, burners 18a and 21a. The supporting structure for the vanes 95 and 96 will preferably include means for retracting them into the fuselage when not in use, and in manner similar to the movement of the landing wheels into and out of their "buried" positions in the fuselage.

Another modification of the cabin structure similar to that of FIG. 8 has been shown in FIG. 11. The cabin 75 and its transparent top 77 may be like the arrangement of FIG. 8, but the driving assembly differs, and there has been introduced additional control features, as will now be described.

Instead of having an exposed rotating assembly as in FIG. 8, the top of the cabin 77 terminates in an outer annular member 110 which is an annulus preferably of metal and which has a smoothly downturned outer end 110a which serves as an air deflector and upward thrust developer in that the compressed air and products of combustion are directed against it. The driving member 111 has an annular portion 112 supported in bearing elements 113 and 114 respectively carried in a channel-shaped support 115 including two annular flanges 115a and 115b. The driving plate 111, in manner mentioned above, has secured around the inner circumference thereof a plurality of air-compressing and driving elements 116. These are preferably welded or otherwise secured to the driving element 111 as by keyways or slots and similarly secured to an upper plate 117 which is preferably annular, though it may include slots as in conventional turbine practice.

The flame-arresting screen 118 marks the end of the air-moving section and the beginning of the combustion zone, which zone is in communication with the driving elements 119 secured to driving member 111 and upper plate 117. These turbine-driving elements 119 may be flat and secured to the members 111 and 117 at angles all inclined in the same direction with respect to the radius of the driving member 111.

As best shown in FIG. 12, the member 110 is provided with a plurality of openings 120a, 120b, 120c, etc. for ingress of air into the compressor section formed by elements 116. In order to regulate the relative proportions of air and fuel, closure members 121 are provided for each of the several air inlets 120a, 120b, etc. These air-controlling elements 121 may be operated individually as by knobs 122, FIG. 11, or they may be ganged for multiple operation. If concurrently operated, then there may be utilized an interconnection between their adjustment and that of the main fuel control valve 42 of FIG. 5 to vary the ratio of fuel to air and to meet the requirements of various flying conditions.

It is to be further observed that in FIG. 11 the blades 116 and 119 extend in a radial direction and do not themselves form a part of the downturned air deflector section 110a. Thus the air-directing section 110a may be made of a high refractory material better to resist the temperature and scrubbing action of the gases. Moreover, it may be a more readily renewable element of greatly decreased cost over that of the blade assembly. Similarly the opposing member 123 may be carried by the cabin structure, suitable labyrinth seals being provided in the region 124, if desired.

It is to be understood that while the fuel has been described as admitted to the air-compressing zone, there will be occasions in which it may be preferred to introduce it directly into the combustion zone. As shown in FIG. 13, arrangements such as in FIGS. 1 and 4 are well adapted to this alternative. In each case it is only necessary to extend the fuel distributing pipes and the distributing heads into the combustion zone and beyond the location of the compressor plates. The fuel supply system then rotates with the driving plate 12 and suitable slip connections are provided at the distributing head 16a.

The oil or fuel pressure at the distributing head 16a in such case need be but of a low order, since there will then be utilized centrifugal force to develop the spraying pressures required at the spray heads. This arrangement, as illustrated in FIG. 13, has the same reference characters applied thereto as in FIG. 1.

It is to be understood that either the fuel distributing heads 18a–23a of FIG. 2 or the arrangement of FIG. 7 may be utilized in the modification of FIG. 13. Thus, in this modification, as well as the one illustrated in FIG. 1 and in other figures, the control valves of FIG. 5 may be concurrently operated as follows.

Fuel may be selectively supplied to the different distributing heads. Inasmuch as the air-compressing blades in every modification move air at relatively high velocity into and through the turbine elements, it will be seen at once that either controlled supply of fuel to these elements or selective ignition of fuel in the combustion zones will permit substantially instantaneous increase and decrease of the ram-jet action previously described. Thus, in the arrangement of FIG. 2, the valves 18b–23b may be operated to supply fuel to selected distributing heads preferably in symmetrical array. For example, fuel may be selectively supplied only to heads 18a, 20a and 22a. To double the thrust with twice the amount of fuel, the heads 19a, 21a, 23a may be supplied with fuel.

Pursuant to the foregoing mode of operation, it is emphasized that the increased flow of combustion products through the turbine blades causes an increase in the speed of rotation and, accordingly, an increase in the low pressure area above the air-compressing elements. Thus, this lifting force is gradually increased, whereas the ram-jet lifting force is instantaneously increased and without any delay such as has been previously required of compressor turbines which delivered the needed air for ram-jet operation. In accordance with the present invention, the ram-jet action may be controlled so as to increase or decrease the lifting forces developed by changing the amount of fuel supplied to active combustion zones or to establish new combustion zones by igniting fuel newly supplied thereto to increase the lifting force or to eliminate fuel supplied thereto to decrease the lifting force.

What is claimed is:

1. A lifting and propelling assembly for heavier-than-air aircraft, comprising a rotatable base member mounted for rotation about a central axis thereof and having a down-turned circumferential portion, an air deflector having a central opening, a plurality of air-compressing elements spaced circumferentially of said central opening and extending vertically between said air deflector and said rotatable base member for compressing air and directing it radially of said rotatable base member, said air deflector being curved downwardly toward and in spaced relation with said rotatable base member for receiving and directing downwardly the air under pressure delivered from said air-compressing elements, turbine-driving elements distributed circumferentially of said rotatable base member and forming a driving connection with said rotatable base member, said rotatable base member having a plurality of discrete segmental combustion zones for fuel and said air under said pressure, and fuel supplying means having structure for sequentially delivering fuel to said plurality of said segmental combustion zones spaced one from the other to provide temperature limiting segments interposed therebetween for limiting the average temperature rise of said turbine-driving elements well below the temperatures developed in said segmental combustion zones to which said fuel is supplied.

2. The combination of claim 1 in which the number of air-compressing elements exceeds the number of turbine-driving elements, and in which structure is provided for supplying air from a plurality of said air-compressing elements to a materially lesser number of said turbine-driving elements for increasing the velocity of the products of combustion discharged from said turbine-driving elements to a value within the ram-jet range.

3. The combination of claim 2 in which control means is arranged to operate said fuel supplying means for introducing said fuel to and burning the same in segmental combustion zones, whereby increase and decrease respectively of the fuel supplied to said segmental zones will without delay increase and decrease said ram-jet action by the increase and decrease respectively of the combustion products discharged from said turbine-driving elements.

4. The combination of claim 1 in which said fuel supplying means includes flow passages rotatable with said rotatable member and extending respectively into said segmental combustion zones for direct delivery of fuel thereto, and to which said fuel is sequentially introduced into said flow passages at regions nearer the axis of said rotatable member than the location of said zones for developing a pressure upon the fuel in said passages by the centrifugal force applied to the fuel therein.

5. The combination of claim 1 in which said fuel supplying means includes a plurality of fuel distributing heads fixed against rotation, each spaced from the other and each disposed for introduction of said fuel into the air delivered to said combustion zones and to said turbine-driving elements.

6. The combination with a rotatable member, of a plurality of air-compressing and turbine-driving elements disposed in circular array around and forming a driving connection with said rotatable member, an enclosing member extending over and around said elements and forming with said rotatable member an air-compressing region, a plurality of discrete segmental combustion zones and a turbine-driving zone, and fuel supplying means having structure for sequentially delivering fuel to said plurality of said segmental combustion zones spaced one from the other to provide temperature limiting segments interposed therebetween for limiting the average temperature rise of said turbine-driving elements well below the temperatures developed in said segmental combustion zones to which said fuel is supplied.

7. The combination of claim 6 in which there is provided frame and cabin structure for a heavier-than-air aircraft and in which said frame is provided with circular means about its periphery and intermediate its top and bottom thereof for rotatably supporting said rotatable member, said enclosing member and said elements, said turbine-driving elements having exit passes for delivery of the products of combustion in directions generally parallel to axis of rotation of said rotatable member.

8. A lifting and propelling device for heavier than air aircraft comprising:

a circular base member having a downturned circumferential portion, a circular air deflector member having a central opening and a downturned circumferential portion, said base member and said air deflector member spaced one from the other a predetermined distance and being substantially symmetrical about a common vertical axis through said central opening, means supporting said base member for rotation about said common vertical axis, a plurality of air compressing elements secured between said base member and said air deflector member and extending radially in balanced relationship from said common vertical axis for partitioning the space between said base member and said air deflector member into a plurality of air compressing and combustion zones for inducting air from said central opening, compressing and expanding said air to produce a radial efflux thereof past said downturn circumferential portion of said base member and said air deflector member to thereby produce a lifting thrust, a plurality of turbine-driving elements secured between said base member and said air deflector member in the region of said downturn circumferential portion of said base member and symmetrically inclined to the path of said radial efflux whereby rotation is imparted to said base member, fuel distribution means disposed within said circular opening and symmetrically positioned about said common vertical axis for sequentially directing fuel pair after pair into at least one pair of oppositely disposed ones of said plurality of air compressing and combustion zones whereby the average temperature rise of said plurality of air compression and combustion zones and said turbine-driving elements is maintained at a minimum while permitting maximum temperatures and efficiency during the period in which a given air compressing and combustion zone is receiving fuel.

9. A lifting and propelling device for heavier than air aircraft comprising:

a circular base member having a downturned circumferential portion, a circular air deflector member having a central opening and a downturned circumferential portion, said base member and said air deflector member spaced one from the other a predetermined distance and being substantially symmetrical about a common vertical axis through said central opening, means supporting said base member for rotation about said common vertical axis, a plurality of air compressing elements secured between said base member and said air deflector member extending radially in balanced relationship from said common vertical axis for partitioning the space between said base member and said air deflector member into a plurality of air compressing and combustion zones for inducting air from said central opening, compressing and expanding said air to produce a radial efflux thereof past said downturn circumferential portion of said base member and said air deflector member to thereby produce a lifting thrust, a plurality of turbine-driving elements secured between said base member and said air deflector member in the region of said downturn circumferential portion of said base member and symmetrically inclined to the path of said radial efflux whereby rotation is imparted to said base member, a fuel distribution system having a plurality of fuel distributing heads symmetrically positioned about said common vertical axis and adjacent said central opening for sequentially directing fuel to said plurality of air compressing and combustion zones, and said plurality of fuel distributing heads supported against rotation about said common vertical axis and being less in number than said plurality of air compressing and combustion zones whereby the average temperature rise of said air compressing and combustion zones and said turbine-driving elements is maintained at a minimum while permitting maximum teperature and efficiency during the period in which a given air compressing and combustion zone is receiving fuel.

References Cited by the Examiner

UNITED STATES PATENTS

| | | | |
|---|---|---|---|
| 1,104,542 | 7/1914 | Porter | 244—23 |
| 2,377,835 | 6/1945 | Weygers | 244—23 |
| 2,850,250 | 9/1958 | Smith | 244—15 X |
| 3,103,325 | 9/1963 | Leutzinger | 244—12 |

FOREIGN PATENTS

| | | |
|---|---|---|
| 1,046,505 | 12/1958 | Germany. |
| 806,614 | 12/1958 | Great Britain. |

MILTON BUCHLER, *Primary Examiner.*

FERGUS S. MIDDLETON, *Examiner.*